(12) United States Patent
Argabright et al.

(10) Patent No.: US 6,392,665 B1
(45) Date of Patent: May 21, 2002

(54) CAPTURE MECHANISM FOR COMPUTER GENERATED MOTION VIDEO IMAGES

(75) Inventors: James W. Argabright, Groton, MA (US); Pramod K. Rustagi, Monte Sereno, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/774,785

(22) Filed: Jan. 30, 2001

Related U.S. Application Data

(63) Continuation of application No. 08/865,571, filed on May 27, 1997, now abandoned.

(51) Int. Cl.$^7$ ................................................. G09G 5/00
(52) U.S. Cl. ....................................... 345/723; 345/726
(58) Field of Search ................................ 345/473, 723, 345/726, 724, 725, 730–732, 821, 638, 634, 650, 661

(56) References Cited

U.S. PATENT DOCUMENTS

| | | | |
|---|---|---|---|
| 5,528,263 A | * | 6/1996 | Platzker et al. |
| 5,613,057 A | * | 3/1997 | Caravel ........................ 345/723 |
| 5,682,326 A | * | 10/1997 | Klingler et al. ............. 345/723 |
| 5,754,170 A | * | 5/1998 | Ranganathan ................ 345/185 |
| 5,793,888 A | * | 8/1998 | Delanoy ...................... 382/219 |
| 5,850,352 A | * | 12/1998 | Moezzi et al. ............... 345/723 |
| 5,949,433 A | * | 9/1999 | Klotz ........................... 345/435 |
| 6,115,037 A | * | 8/2000 | Sumiyoshi et al. .......... 345/726 |
| 6,323,877 B1 | * | 11/2001 | Katoh et al. ................. 345/638 |

* cited by examiner

*Primary Examiner*—Steven Sax
(74) *Attorney, Agent, or Firm*—Conley, Rose & Tayon, PC; B. Noël Kivlin

(57) ABSTRACT

A motion video image capture (MVIC) process monitors interaction between an authoring process and a graphics display library and captures each frame of the motion video image created by the authoring process. By capturing each frame of the motion video image created by the authoring process, the MVIC process can recreate the motion video image without storing or reexecuting the specific graphics display instructions executed by the authoring process. In addition, the frames can be collectively stored in a compact, standard motion video image format for delivery through at network such as the Internet using a standard multimedia protocol such as the World Wide Web. The MVIC process determines when the authoring process has completed a frame of the motion video image by interposing the MVIC process between the authoring process and the graphics display library and monitoring procedures of the graphics display library invoked by the authoring process. The MVIC process interprets invocation of a graphics pipeline flush procedure as an indication that the frame buffer contains pixel data representing a completed frame of the motion video image. The MVIC process retrieves pixel data from the frame buffer in response to detection of such invocation to thereby capture the completed frame. Once the MVIC process captures a completed frame of the motion video image from the frame buffer, the MVIC process stores the captured frame as a frame in a stored motion video image in the compact, standard motion video image format.

45 Claims, 4 Drawing Sheets

CAPTURE MECHANISM FOR COMPUTER GENERATED MOTION VIDEO IMAGES

This application is a continuation of U.S. Ser. No. 08/865,571, filed May 27, 1997, now abandoned.

FIELD OF THE INVENTION

The present invention relates to graphical image processing in a computer system and, in particular, to a mechanism for capturing computer generated motion video images.

BACKGROUND OF THE INVENTION

As processing and storage capacity of today's computers and, in particular, personal computers, continue to increase significantly, generation by computers of motion video images is becoming ever increasingly, common and popular. Users of such computers have access to a wide variety of computer programs which are capable of generating sophisticated and complex motion video images. Examples of such images include (i) three-dimensional, perspective projection, motion graphical images representing inter-operation of parts designed using computer aided design/computer aided manufacturing (CAD/CAM) systems; (ii) computer-generated special effects for use in television program production, primarily sports and news; (iii) computer-generated animations which are designed as artistic and/or entertaining audio-visual works in their own right. Computers which generate motion video images from model data are sometimes referred to herein as authoring programs.

In addition, growing popularity of very large computer networks such as the Internet and networks having multimedia content such as the World Wide Web has cultivated a very strong demand for motion video images in a sufficiently compact form that such motion video signals can be transported through such networks. Accordingly, motion video image formats such as AVI, MPEG, QuickTime, and Animated GIF have become very popular recently and computer software readers which can receive, decode and display such motion video images have been installed in a multitude of client computer systems connected through such networks.

Many of the computer programs which generate motion video images do so from model data which define the animation and can only reproduce the motion video images by re-generating the motion video images from the same model data In other words, many authoring programs provide no mechanism by which a user of an authoring program can record and store the computer-generated motion video image either (i) for subsequent playback without having to recreate a particular operating environment of the program or (ii) for delivery through a multimedia-based network protocol using a compact motion video image format such as AVI, MPEG, QuickTime, or Animated GIF. While it may be possible to re-design authoring programs to store motion video images which are generated, the user of such an authoring program frequent lacks either the ability, inclination, or access to make such changes.

Some attempts have been made to intercept and store graphics display instructions produced by a CAD/CAM program to cause display of the motion video image produced by the program in a computer display device. By intercepting and storing such graphics display instructions, such instructions can be subsequently retrieved and re-executed to re-display the motion video image in the computer display device. One such system is the Shared Library Interposer (SLI) developed by Sun Microsystems, Inc. of Mountain View, Calif. SLI served its intended purpose, namely, capturing a sequence of graphics display instructions for analysis and error detection and correction, very well. However, SLI is poorly adaptable to the purpose of recording motion video signals for subsequent playback or delivery.

First, since the motion video image is reproduced by exact replication of the precise graphical display instructions, each and every such graphical display instruction must be executed and the order in which the graphical display instructions are executed must be the same as the order in which the instructions were executed by the authoring program. Even such instructions as those which open the graphics device for access and allocate various states and resources must be executed. Such limits the playback of the motion video image to precisely the same computer display device on which the authoring program displayed the motion video image. In addition, the motion video image can only be reproduced from the very beginning, i.e., beginning portions of the motion video image cannot be omitted from the recorded motion video image.

Second, since each and every graphical display instruction is stored for subsequent re-execution, a tremendous amount of computer memory is required to store the recorded motion video image. Typically, approximately one gigabyte or more is required to store a moderately complex motion video signal. Thus, motion video images which are recorded in this manner are too large to transmit through practically any currently available network medium What is needed therefore is a mechanism by which motion video images generated by an authoring program can be recorded and stored in a compact format which is suitable for delivery through a computer network. The mechanism should enable the recording to begin some time into the motion video image such that beginning portions of the motion video image can be omitted from the recorded motion video image. In addition, the format of the motion video image should be portable, i.e., should enable re-display of the motion video image on computer display devices and platforms other than the computer display device and platform for which the motion video image was generated by the authoring program.

In accordance with the present invention, a motion video image capture (MVIC) process monitors interaction between an authoring process and a graphics display library and captures each frame of the motion video image created by the authoring process. By capturing each frame of the motion video image created by the authoring process, the MVIC process can recreate the motion video image without storing or re-executing, the specific graphics display instructions executed by the authoring process. In addition, the frames can be collectively stored in a compact, standard motion video image format, e.g., any of the known MPEG, AVI, QuickTime, or Animated GIF formats, which can then be easily delivered through a network such as the Internet using a standard multimedia protocol such as the World Wide Web. Alternatively, the frames can be stored as individual graphics images in a standard, compact graphical image format such as any of the known JPEG, GIF, or TIFF formats.

Further in accordance with the present invention, the MVIC process monitors interaction between the authoring, process and the graphics display library using a conventional mechanism known as interposing. By interposing the MVIC process between the authoring process and the graphics display library, the MVIC process can monitor procedures of the graphics display library invoked by the authoring process.

The MVIC process monitors procedures of the graphics display library invoked by the authoring process for a target procedure which is invoked either at the completion of display of a frame or prior to display of a new frame. Such a target procedure can be, for example, a graphics pipeline flush or end-of-frame procedure which causes all graphical image data which is queued for transfer to a frame buffer to be immediately transferred to the frame buffer. Such graphics pipeline flush procedures are known by various identifiers in various respective implementations but serve the same primary purpose, i.e., are invoked by the authoring process only when a frame of the motion video image is complete and should therefore be displayed for the user prior to generation and display of the next frame of the motion video image. Other procedures which can be used as a target procedure also include (i) a swap buffer procedure which causes the contents of a temporary buffer to be loaded into the frame buffer and (ii) a new frame procedure which indicates that the last frame is complete and should be displayed and a buffer should be initialized for display of a new frame. Accordingly, the MVIC process interprets invocation of any such target procedure as an indication that the frame buffer contains pixel data representing a completed frame of the motion video image. The MVIC process therefore retrieves pixel data from the frame buffer in response to detection of invocation of the target procedure to thereby capture the completed frame.

Once the MVIC process captures a completed frame of the motion video image from the frame buffer, the MVIC process stores the captured frame as a frame in a stored motion video image in a compact, standard motion video image format or still image format.

Thus, existing authoring processes can be used to generate and display motion video images and those motion video images can be easily and efficiently captured and stored in a compact, standard format. Accordingly, the motion video image can be delivered through a network such as the Internet and replayed remotely by a receiving computer system. In addition, the capture and storage of the motion video image is accomplished without modification to the authoring process. As a result, any of a multitude of currently available authoring processes can generate and display motion video images which can be stored for subsequent distribution through a network or for subsequent local redisplay without modification of the authoring processes and notwithstanding failure of the authoring process to provide for such capture and storage.

DETAILED DESCRIPTION

Figure 1:
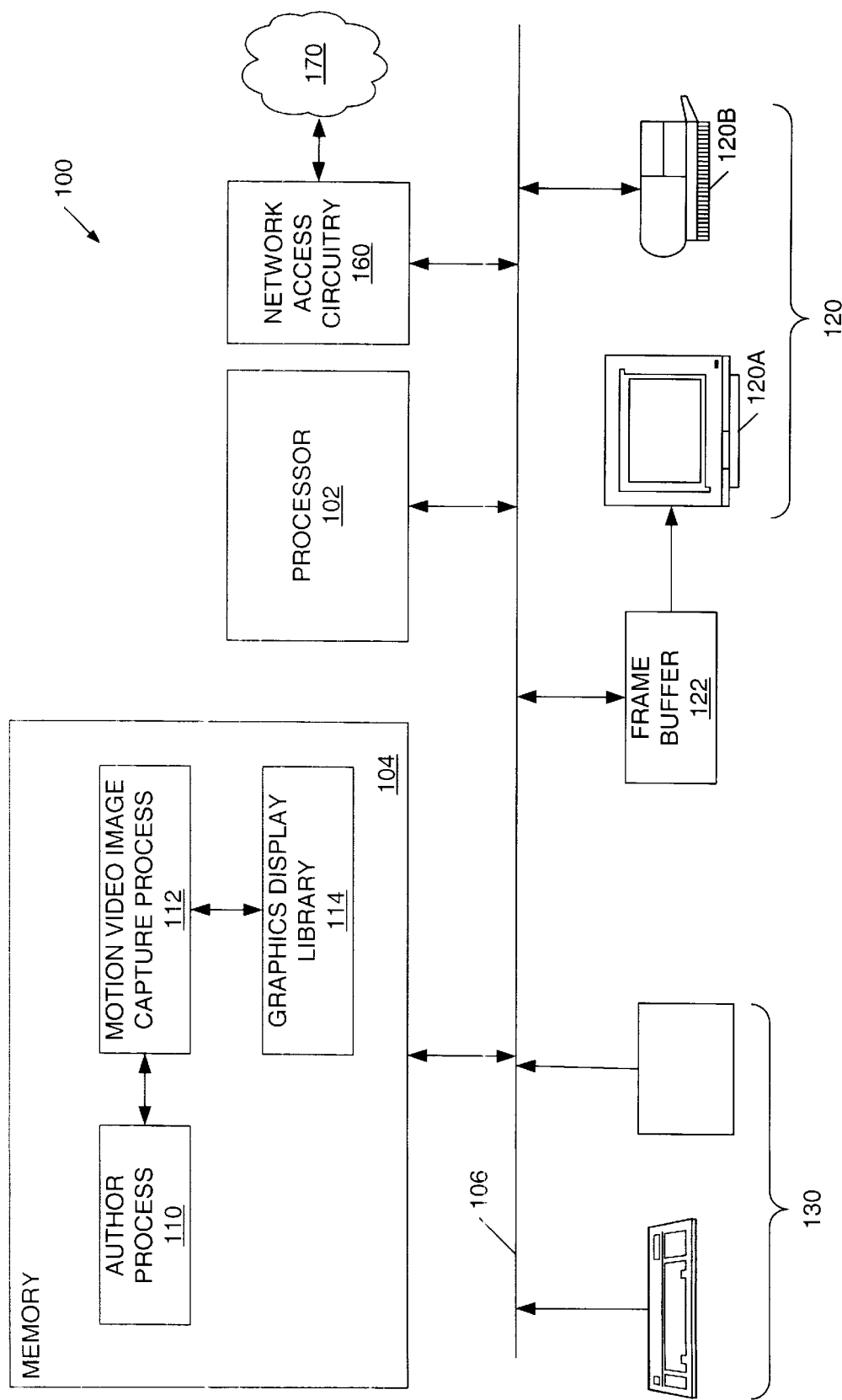
FIG. 1 is a block diagram of a computer system according to the present invention which includes an authoring process, a motion video image capturing process, and a graphics display library.

In accordance with the present invention, a motion video image capture (MVIC) process 112 (FIG. 1) monitors interaction between an authoring, process 110 and a graphics display library 114 and captures each frame of the motion video image created by authoring process 110. By capturing each frame of the motion video image created by authoring process 110, MVIC process 112 can recreate the motion video image without storing or re-executing the specific graphics display instructions executed by authoring process 110. In addition, the frames can be collectively stored in a compact, standard motion video image format, e.g., MPEG, AVI QuickTime, or Animated GIF, which can then be easily delivered through a network such the Internet using a standard multimedia protocol such as the World Wide Web.

MVIC process 112 monitors interaction between authoring process 110 and graphics display library 114 using a conventional mechanism known as interposing. Ordinary, authoring process 110 issues instructions which are processed directly by graphics display library 114. Graphics display library 114 is a run-time library, i.e., is loaded from secondary storage in memory 104 into primary storage in memory 104 such that component instructions of graphics display library 114 can be directly retrieved and executed by a processor 102 when procedures of graphics display library 114 are invoked. Thus, during execution, authoring process 110 invokes a procedure which is defined within graphics display library 114. Ordinarily, such invocation causes loading of graphics display library 114 and execution of the invoked procedure. However, since MVIC process 112 is interposed between authoring process 110 and graphics display library 114, MVIC process 112 can invoke additional procedures which are then executed in response to the invocation by authoring process 110.

Figure 2:
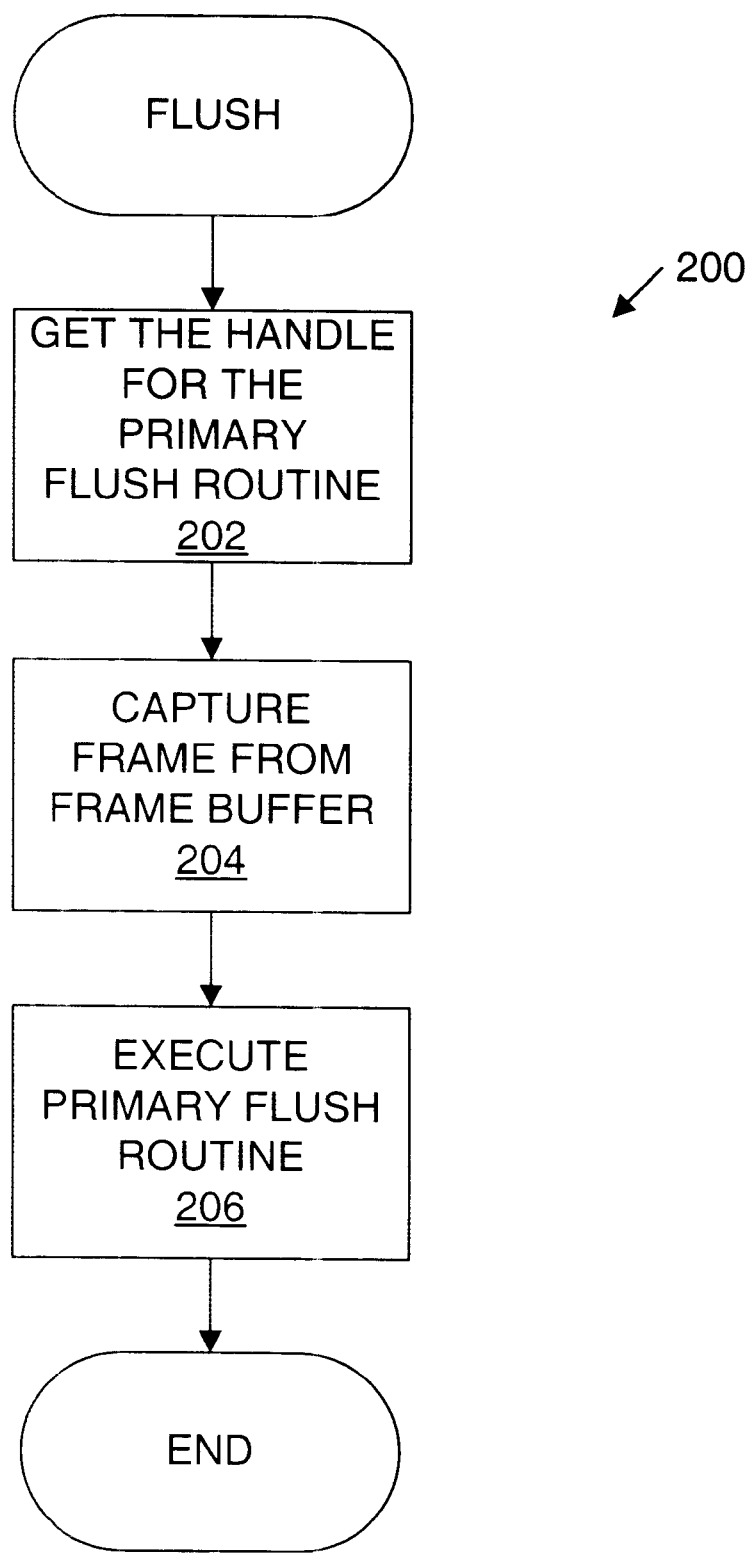
FIG. 2 is a logic flow diagram illustrating the process of the motion video image capturing process of FIG. 1.

Processing by MVIC process 112 is shown as logic flow diagram 200 (FIG. 2).

Specifically, logic flow diagram 200 shows processing by MVIC process 112 (FIG. 1).

Graphics display library 114 defines a flush( ) procedure which causes all buffered graphics data to by display on a computer display device 120A by transferring the graphics data to a frame buffer 122. Computer display device 120A and frame buffer 122 are conventional Briefly, frame buffer 122 stores data which is directly represented on computer display device 120A Typically, an authoring process such as authoring process 110 invokes the flush( ) procedure of graphics display library 114 immediately following completion of an individual frame of a motion video image since it is generally desirable to have the completed frame displayed for the user prior to creating and displaying a subsequent frame. By interposing on the flush( ) procedure, MVIC process 112 intercepts invocations of the flush( ) procedure defined by graphics display library 114.

While it is described that MVIC process 112 intercepts invocations of a flush( ) procedure, it is appreciated that, in other graphics display libraries, completion of display of a frame of a motion video image accompanies invocation of other procedures. For example, end-of-frame, swap-buffer, new-frame and similar procedures are invoked in various graphics display environments to indicate that display of a particular frame of a motion video image is complete and subsequent graphical display instructions pertain to a new frame of the motion video image.

Any such procedure, including the flush( ), end-of-frame, swap-buffer, and new-frame procedures, can serve as a target procedure. In this illustrative embodiment, the flush( ) procedure is the target procedure and indicates that display of a particular frame of a motion video image is complete and subsequent graphical display instructions pertain to a new frame of the motion video image.

Accordingly, the flush( ) procedure is sometimes referred to herein as the target procedure.

Processing by MVIC process 112 in response to an invocation of the target procedure begins in step 202 (FIG. 2) of logic flow diagram 200. In step 202, MVIC process 112 (FIG. 1) gets the handle of the primary target procedure defined by graphics display library 114. A handle of a procedure is an identifier by which the procedure is identified for purposes of invocation of the procedure. By getting the handle of the primary target procedure, MVIC 112 can subsequently invoke the primary target procedure as described more completely below.

Processing transfers to step 204 (FIG. 2) in which MVIC process 112 (FIG. 1) captures the contents of frame buffer 122 to thereby capture the frame generation and display of which is just completed by authoring process 110. Processing by MVIC process 112 in step 204 (FIG. 2) is shown in greater detail as logic flow diagram 204 (FIG. 3) in which processing begins with test step 302. In test step 302, MVIC process 112 (FIG. 1) determines whether the current performance of the steps of logic flow diagram 204 (FIG. 3) is the first performance of the steps of logic flow diagram 204. If the current performance is not the first performance, processing transfers to step 308 which is described more completely below. Conversely, if the current performance is the first performance, processing transfers from test step 302 to step 304.

In step 304, MVIC process 112 (FIG. 1) starts a control process if such a process is not already executing within computer system 100. The control process allows a user to start and stop capturing of frames by MVIC process 112 in a manner described more completely below in conjunction with FIG. 4. Processing transfers to step 306 (FIG. 3) in which MVIC process 112 (FIG. 1) creates a place within memory 104 in which to store individual captured frames. In one embodiment, captured frames are stored as individual files and the place created by MVIC process 112 is a directory in a storage device of memory 104 within which to store the captured frames. Processing transfers from step 306 (FIG. 3) to test step 308.

In test step 308, MVIC process 112 (FIG. 1) determines whether MVIC process 112 is in a state in which frames are captured. This state is controlled by a user in a manner described more completely below in the context of FIG. 4. If MVIC process 112 is not in a state in which frames are captured, processing according to logic flow diagram 204 (FIG. 3), and therefore step 204 (FIG. 2), completes. Conversely, if MVIC process 112 (FIG. 1) is in a state in which frames are captured, processing transfers from test step 308 to step 310.

In step 310, MVIC process 112 (FIG. 1) allocates a storage buffer within memory 104 for storage of a frame of the motion video image which is currently displayed in computer display device 120A MVIC process 112 determines the size of the frame by determining the number of rows and columns of pixels of the frame and the amount of data used to represent each pixel of the frame within frame buffer 122 to which authoring process 110 is writing pixel data, i.e., the frame which authoring process 110 is flushing by invocation of the target procedure. MVIC process 112 allocates a buffer of the determined size.

In step 312 (FIG. 3), MVIC process 112 (FIG. 1) invokes the target procedure within graphics display library 114 such that the substantive effect of execution of the target procedure is realized. In the illustrative embodiment in which the target procedure is a flush( ) procedure, invocation of the target procedure flushes a pipeline in which pixels intended by authoring process 110 to be transferred to frame buffer 122 are stored pending subsequent transfer to frame buffer 122. Such a pipeline is typically used in conjunction with a frame buffer such as frame buffer 122 to minimize overhead in data traffic to and from frame buffer 122. Using such pipelines enable use of particularly fast and efficient bulk data transfers between memory 104 and frame buffer 122 such as direct memory access (DMA) operations. By flushing the pipeline, MVIC process 112 causes any such pixel data to be written to frame buffer 122. More generally, by involving the target procedure within graphics display library 114, MVIC process 112 causes the image intended by authoring process 110 to be displayed in computer display device 120A as a fame of the motion video image is represented completely within frame buffer 122.

Figure 3:
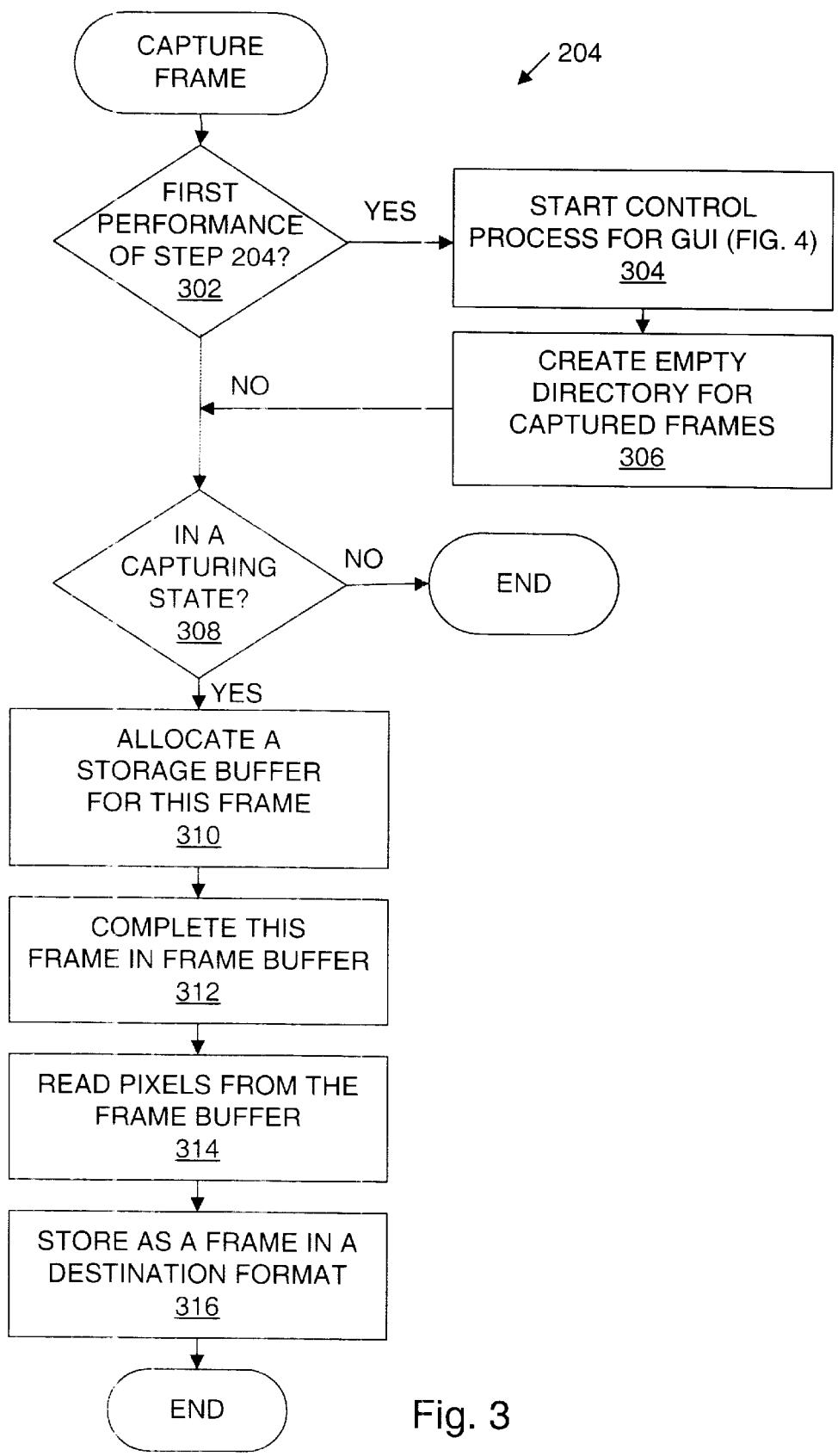
FIG. 3 is a logic flow diagram illustrating in greater detail a step of the logic flow diagram of FIG. 2.

Processing transfers to step 314 (FIG. 3) in which MVIC process 112 (FIG. 1) reads pixel data from the portion of frame buffer 122 to which authoring process 110 writes pixel data to render the frames of the motion video image. As a result, MVIC process 112 captures an image which represents a single frame of the motion video image generated by authoring process 110. Processing transfers to step 316 (FIG. 3).

In step 316, MVIC process 112 (FIG. 1) stores the captured frame in the format of a frame of a desired motion video image format. In one embodiment, MVIC process 112 stores the captured frame in a GIF format such that the captured frame is a frame of an Animated GIF motion video image. The Animated GIF format provides relatively good image quality and is relatively compact. Accordingly, the Animated GIF format is relatively well suited for delivery of motion video images through networks such as the Internet. After step 316 (FIG. 3), processing according to logic flow diagram 204, and therefore step 204 (FIG. 2) completes.

Processing by MVIC process 112 (FIG. 1) transfers from step 204 (FIG. 2) to step 206. In step 206, MVIC process 112 (FIG. 1) invokes the target procedure as defined and implemented by graphics display library 114. Thus, if performance of step 312 (FIG. 3) is bypassed because MVIC process 112 (FIG. 1) is not in a state in which frames are captured, the processing of author process 110 is not adversely affected by MVIC process 112 and the substantive effect of the target procedure within graphics display library 114 is realized.

Thus, when authoring process 110 invokes the target procedure to cause a complete frame of the motion video image to be completely displayed on computer display device 120A, MVIC process 112 detects that invocation and captures the complete frame image from frame buffer 122 and stores the captured frame as a frame of a stored motion video image. Authoring process 110 then generates and displays a subsequent frame of the motion video image and, when finished, again invokes the target procedure. In response thereto, MVIC process 112 again performs the steps of logic flow diagram 200 (FIG. 2) and captures the subsequent frame, adding the subsequent frame to the stored motion video image. In this manner, MVIC process 112 can capture the entire motion video image generated and displayed by authoring process 110. By storing the stored motion video image in a standard motion video image format, the stored motion video image can be subsequently re-displayed using any conventional motion video image viewer process which is capable of displaying motion video images of the standard format. Such viewer processes are widely available from numerous sources.

User Interface

It is sometimes desirable to capture only a portion of the motion video image generated by authoring process 110. Accordingly, in step 304 (FIG. 3), MVIC process 112 (FIG. 1) displays in computer display device 120A a capture control window 402 (FIG. 4) which includes a number of virtual buttons which a user can actuate using conventional graphic user interface techniques. Specifically, capture control window 402 includes a start button 404, a stop button 406, and a quit button 408.

When MVIC process 112 (FIG. 1) is initially started, MVIC process 112 is in a state in which MVIC process 112 does not capture frames of the motion video image, ie., does not perform steps 310–316 (FIG. 3) in response to invocation of the target procedure by authoring process 110 (FIG. 1) and therefore does not capture frames of the motion video image generated and displayed by authoring process 110. When the user actuates start button 404. (FIG. 4) in a manner described more completely below, MVIC process 112 (FIG. 1) changes its state such that MVIC process 112 captures frames of the motion video image created by author process 110, i.e., performs steps 310–316 (FIG. 3) in the manner described above, in response to invocation by authoring process 110 (FIG. 1) of the target procedure. Thus, actuation of start button 404 (FIG. 4) by the user causes MVIC process 112 (FIG. 1) to capture frames as they are generated and displayed by authoring process 110 in the manner described above.

User actuation of stop button 406 (FIG. 4) causes MVIC process 112 (FIG. 1) to change its state to the initial state such that MVIC process 112 no longer performs steps 310–316 (FIG. 3) in response to invocation of the target procedure by authoring process 110 (FIG. 1) and therefore does not capture frames of the motion video image generated and displayed by authoring process 110. The user can thus suspend capture by MVIC process 112 of the motion video image generated and displayed by authoring process 110. The user can cause MVIC process 112 to resume capture of the motion video image by subsequently actuating start button 404 (FIG. 4).

Figure 4:
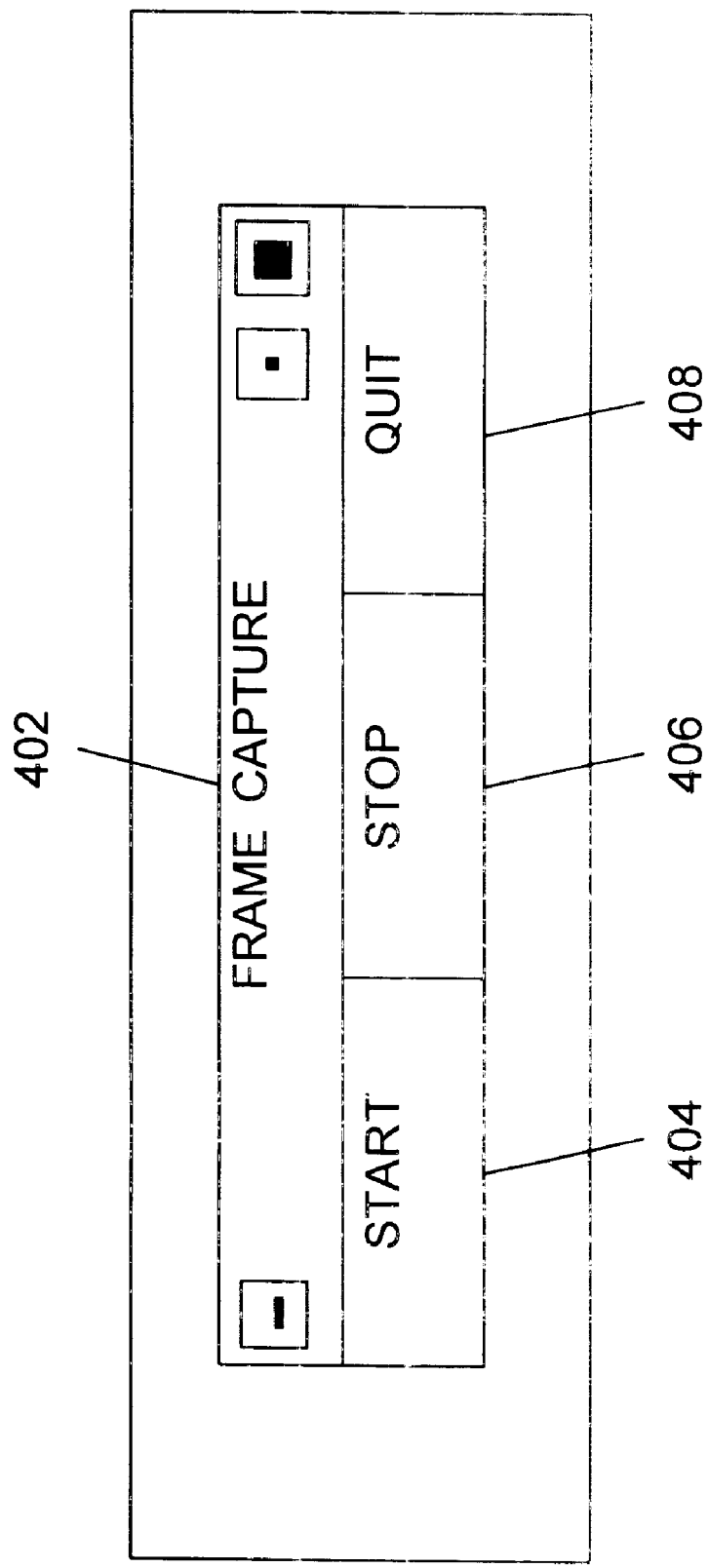
FIG. 4 illustrates a capture control window of a graphical user interface by which a user controls starting and stopping of capture of a motion video image by the motion video image process of FIG. 1.

MVIC process 112 (FIG. 1) terminates execution in response to user actuation of quit button 408 (FIG. 4).

Operating Environment

As described briefly above, authoring process 110, MVIC process 112, and graphics display library 114 execute in processor 102 from memory 104. Computer system 100 (FIG. 1) includes processor 102 and memory 104 which is coupled to processor 102 through an interconnect 106. Interconnect 106 can be generally any interconnect mechanism for computer system components and can be, e.g., a bus, a crossbar, a mesh, a torus, or a hypercube. Processor 102 fetches from memory 104 computer instructions and executes the fetched computer instructions. In addition, processor 102 can fetch computer instructions through a computer network 170 through network access circuitry 160 such as a modem or ethernet network access circuitry. Processor 102 also reads data from and writes data to memory 104 and sends data and control signals through interconnect 106 to one or more computer display devices 120 and receives data and control signals through interconnect 106 from one or more computer user input devices 130 in accordance with fetched and executed computer intructions.

Memory 104 can include any type of computer memory and can include, without imitation, randomly accessible memory (RAM), read-only memory (ROM), and storage devices which include storage media such as magnetic and/or optical disks. Memory 104 includes authoring process 110, MVIC process 112, and graphics display library 114 authoring process 110, MVIC process 112, and graphics display library 114 collectively form all or part of a computer process which in turn executes within processor 102 from memory 104. A computer process is generally a collection of computer instructions and data which collectively define a task performed by computer system 100.

Each of computer display devices 120 can be any type of computer display device including without limitation a printer, a cathode ray tube (CRT), a light-emitting diode (LED) display, or a liquid crystal display (LCD). Each of computer display devices 120 receives from processor 102 control signals and data and, in response to such control signals, displays the received data. Computer display devices 120, and the control thereof by processor 102, are conventional.

Frame buffer 122 is coupled between interconnect 106 and computer display device 120A and processes control signals received from processor 102 to effect changes in the display of computer display device 120A represented by the received control signals. Frame buffer 122 stores data which represents the display of computer display device 120A such that the display of computer display device can be changed by writing new data to frame buffer 122 and the display can be determined by a process executing in computer system 100 by reading data from fame buffer 122.

Each of user input devices 130 can be any type of user input device including, without limitation, a keyboard, a numeric keypad, or a pointing device such as an electronic mouse, trackball, lightpen, touch-sensitive pad, digitizing tablet, thumb wheels, or joystick. Each of user input devices 130 generates signals in response to physical manipulation by a user and transmits those signals through interconnect 106 to processor 102. For example, if one of user input devices 130 is an electronic mouse device, a user can actuate start button 404 (FIG. 4) by physically manipulating the electronic mouse device to place a cursor over start button 404 in the display of computer display device 120A (FIG. 1) and actuating a physical button on the electronic mouse device.

As described above, authoring process 110, MVIC process 112, and graphics display library 114 execute within processor 102 from memory 104. Specifically, processor 102 fetches computer instructions from authoring process 110, MVIC process 112, and graphics display library 114 and executes those computer instructions. Processor 102, in executing authoring process 110, MVIC process 112, and graphics display library 114, generates and displays a motion video image in computer display device 120A and captures all or part of the motion video image in accordance with user input signals generated by physical manipulation of one or more of user input devices and causes the captured motion video image to be stored in memory 104 in the manner described more completely above.

In one embodiment, processor 102 is the UltraSPARC processor available from Sun Microsystems, Inc. of Mountain View, Calif., and computer system 100 is the UltraSPARCStation workstation computer system available from Sun Microsystems, Inc. of Mountain View, Calif. Sun, Sun Microsystems, and the Sun Logo are trademarks or registered trademarks of Sun Microsystems, Inc. in the United States and other countries. All SPARC trademarks are used under license and are trademarks of SPARC Interatonal, Inc. in the United States and other countries. Products bearing SPARC trademarks are based upon an architecture developed by Sun Microsystems, Inc.

The above description is illustrative only and is not limiting. The present invention is limited only by the claims which follow.

What is claimed is:

1. A computer system comprising:
   a processor;
   a memory coupled to the processor;
   a frame buffer coupled to the processor and the memory and configured to store a frame of pixel data; and
   a display coupled to the frame buffer and configured to display the frame of pixel data stored in the frame buffer;
   an authoring process executable by the processor and configured to generate at least one frame of a motion video image, wherein the authoring process is configured to invoke a target procedure when a completed frame of the motion video image has been generated;
   a graphics library comprising the target procedure; and
   a motion video image capture process executable by the processor and interposed between the authoring process and the graphics library, wherein the motion video image capture process is configured to capture the completed frame of the motion video image generated by the authoring process by:
      detecting an invocation of the target procedure by the authoring process;
      retrieving pixel data representing the completed frame from the frame buffer in response to said detecting; and
      storing data representative of the pixel data in a memory in response to said retrieving.

2. The computer system of claim 1, wherein the motion video image capture process is configured to store data representative of the pixel data by encoding the data in a JPEG format.

3. The computer system of claim 1, wherein the motion video image capture process is configured to store data representative of the pixel data by encoding the data in a GIF format.

4. The computer system of claim 1, wherein the motion video image capture process is configured to store data representative of the pixel data by storing the data as an individual still image.

5. The computer system of claim 1, wherein the motion video image capture process is configured to store data representative of the pixel data by storing the data collectively with collective data representative of other pixel data representative of previously captured frames of the motion video image.

6. The computer system of claim 5, wherein the motion video image capture process is configured to store the data collectively with collective data by encoding the data in a MPEG format.

7. The computer system of claim 1, wherein the target procedure is executable by the processor to store the pixel data representing the completed frame of the motion video image in the frame buffer.

8. The computer system of claim 7, wherein the target procedure comprises a graphics pipeline flush procedure.

9. The computer system of claim 7, wherein the motion video image capture process is further configured to retrieve the pixel data representing the completed frame from the frame buffer by invoking execution of the target procedure in order to allow the pixel data to be written to the frame buffer prior to retrieving the pixel data.

10. The computer system of claim 1, wherein the target procedure is executable by the processor to initialize the frame buffer so the frame buffer can store a new frame of the motion video image.

11. The computer system of claim 1, wherein the motion video image capture process is further configured to capture the completed frame of the motion video image generated by the authoring process by:
   calculating a size of the pixel data representing the completed frame of the motion video image; and
   allocating a storage buffer within the memory, wherein a size of the storage buffer corresponds to the size of the completed frame of the motion video image;
   wherein the motion video image capture process is executable to store data representative of the pixel data in a memory in response to said retrieving by storing the data representative of the pixel data in the storage buffer.

12. The computer system of claim 11, wherein the motion video image capture process is further configured to calculate a size of the pixel data representing the completed frame by determining a number of rows and a number of columns of pixels in the completed frame, and by determining an amount of data used to represent each pixel in the completed frame.

13. The computer system of claim 1, wherein the motion video image capture process is further executable to change, in response to signals generated by a user, from a stopped state, in which said retrieving is not performed in response to detecting an invocation of the target procedure by the authoring process, to a capturing state, in which said retrieving is performed in response to detecting an invocation of the target procedure by the authoring process.

14. The computer system of claim 1, wherein the motion video image capture process is further executable to change, in response to signals generated by a user, from a capturing state, in which said retrieving is performed in response to detecting an invocation of the target procedure by the authoring process, to a stopped state, in which said retrieving is not performed in response to detecting an invocation of the target procedure by the authoring process.

15. The computer system of claim 1, wherein the motion video image capture process is further executable to capture a second completed frame of the motion video image.

16. A method of capturing at least one frame of a motion video image for subsequent display, the method comprising:
   executing an authoring process in a computer system, wherein the authoring process is configured to generate at least one frame of a motion video image when executing, wherein the authoring process is further configured to invoke a target procedure when a completed frame has been completely generated;
   interposing a motion video image capture process between the authoring process and a graphics library, wherein the graphics library includes the target procedure;
   storing pixel data representing the completed frame in a frame buffer, wherein said storing causes the completed frame to be displayed on a display device;
   determining that the authoring process has completed generation of a completed frame of the motion video image by using the motion video image capture process to detect an invocation of the target procedure by the authoring process;
   retrieving the pixel data from the frame buffer in response to said determining; and
   storing data representative of the pixel data in a memory in response to said retrieving.

17. The method of claim 16, wherein said storing data representative of the pixel data comprises encoding the data in a JPEG format.

18. The method of claim 16, wherein said storing data representative of the pixel data comprises encoding the data in a GIF format.

19. The method of claim 16, wherein said storing data representative of the pixel data comprises storing the data as an individual still image.

20. The method of claim 19, further comprising transmitting the individual still image over a network to a receiving computer system.

21. The method of claim 16, wherein said storing data representative of the pixel data comprises storing the data collectively with collective data representative of other pixel data representative of other frames of the motion video image.

22. The method of claim 21, wherein said storing data representative of the pixel data further comprises encoding the data in a MPEG format.

23. The method of claim 22, further comprising transmitting the collective data over a network to a receiving computer system.

24. The method of claim 16, wherein execution of the target procedure causes the pixel data representing the completed frame of the motion video image to be stored in the frame buffer.

25. The method of claim 24, wherein said storing pixel data representing the completed frame in a frame buffer comprises the motion video image capture process invoking execution of the target procedure in response to said determining and the target procedure causing pixel data representing the completed frame to be stored in the frame buffer in response to said invoking execution.

26. The method of claim 24, wherein the target procedure comprises a graphics pipeline flush procedure.

27. The method of claim 16, wherein execution of the target procedure causes the frame buffer to be initialized to store a new frame of the motion video image.

28. The method as recited in claim 16, further comprising
calculating a size of the pixel data representing the completed frame of the motion video image;
allocating a storage buffer in a memory, wherein a size of the storage buffer corresponds to the size of the completed frame of the motion video image;
wherein said storing data representative of the pixel data in a memory occurs in response to said allocating.

29. The method as recited in claim 28, wherein said calculating comprises determining a number of rows and a number of columns of pixels in the completed frame and determining an amount of data used to represent each pixel.

30. The method of claim 16, wherein the said retrieving comprises invoking execution of the target procedure in order to allow the pixel data to be written to the frame buffer prior to said retrieving the pixel data.

31. The method of claim 16, further comprising changing, in response to signals generated by a user, from a stopped state, in which said retrieving is not performed in response to said determining, to a capturing state, in which said retrieving is performed in response to said determining.

32. The method of claim 16, further comprising changing, in response to signals generated by a user, from a capturing state, in which said retrieving is performed in response to said determining, to a stopped state, in which said retrieving is not performed in response to said determining.

33. The method of claim 16, further comprising repeating said storing, determining, retrieving, and storing for a second completed frame of the motion video image.

34. A computer readable medium comprising program instructions for a motion video image capture process, operable to:
determine that an authoring process has completed generation of a completed frame of a motion video image by detecting that the authoring process has invoked a target procedure from a graphics library, wherein the authoring process is a process running on a computer system;
retrieve pixel data representing the completed frame from a frame buffer in response to determining that the authoring process has completed generation of the completed frame; and
store data representative of the pixel data in a memory in response to retrieving the pixel data from the frame buffer.

35. The computer readable medium of claim 34, wherein the program instructions are further operable to store data representative of the pixel data by encoding the data in a JPEG format.

36. The computer readable medium of claim 34, wherein the program instructions are further operable to store data representative of the pixel data by encoding the data in a GIF format.

37. The computer readable medium of claim 34, wherein the program instructions are further operable to store data representative of the pixel data by storing the data as an individual still image.

38. The computer readable medium of claim 34, wherein the program instructions are further operable to store data representative of the pixel data by storing the data collectively with collective data representative of other pixel data representative of other frames of the motion video image.

39. The computer readable medium of claim 38, wherein the program instructions are further operable to store the data collectively by encoding the data in a MPEG format.

40. The computer readable medium of claim 34, wherein the target procedure comprises a graphics pipeline flush procedure.

41. The computer readable medium of claim 34, wherein the program instructions are further operable to:
calculate a size of the pixel data representing the completed frame of the motion video image;
allocate a storage buffer in a memory, wherein a size of the storage buffer corresponds to the size of the completed frame of the motion video image; and
store data representative of the pixel data in a memory in response to retrieving the pixel data from the frame buffer by storing the data in the storage buffer.

42. The computer readable medium of claim 34, wherein the program instructions are further operable to calculate a size of the pixel data by determining a number of rows and a number of columns of pixels in the completed frame and determining an amount of data used to represent each pixel.

43. The computer readable medium of claim 34, wherein the program instructions are further operable to retrieve pixel data representing the completed frame from a frame buffer by invoking execution of the target procedure in order to allow the pixel data to be written to the frame buffer prior to retrieving the pixel data.

44. The computer readable medium of claim 34, wherein the program instructions are further operable to change, in response to signals generated by a user, from a stopped state, in which retrieving is not performed in response to said determining, to a capturing state, in which said retrieving is performed in response to said determining.

45. The computer readable medium of claim 34, wherein the program instructions are further operable to change, in response to signals generated by a user, from a capturing state, in which said retrieving is performed in response to said determining, to a stopped state, in which retrieving is not performed in response to said determining.

* * * * *